(12) United States Patent
Klein

(10) Patent No.: US 7,171,483 B2
(45) Date of Patent: Jan. 30, 2007

(54) REDUCING INFORMATION TRANSMISSION TIME BY ADAPTING INFORMATION DELIVERY TO THE SPEED OF A GIVEN NETWORK CONNECTION

(75) Inventor: Paul F. Klein, Thousand Oaks, CA (US)

(73) Assignee: International Business Machines Corporation, Armonk, NY (US)

( * ) Notice: Subject to any disclaimer, the term of this patent is extended or adjusted under 35 U.S.C. 154(b) by 1001 days.

(21) Appl. No.: 09/849,322

(22) Filed: May 4, 2001

(65) Prior Publication Data

US 2001/0029537 A1  Oct. 11, 2001

Related U.S. Application Data

(63) Continuation-in-part of application No. 09/761,904, filed on Jan. 17, 2001, now Pat. No. 6,341,260, and a continuation-in-part of application No. 09/711,660, filed on Nov. 13, 2000, which is a continuation of application No. 09/428,271, filed on Oct. 27, 1999, now Pat. No. 6,202,036, and a continuation-in-part of application No. 09/428,262, filed on Oct. 27, 1999, now Pat. No. 6,526,371, which is a continuation of application No. 08/899,195, filed on Jul. 23, 1997, now Pat. No. 5,991,705.

(60) Provisional application No. 60/214,281, filed on Jun. 22, 2000, provisional application No. 60/172,026, filed on Dec. 23, 1999.

(51) Int. Cl.
*G06F 15/16* (2006.01)

(52) U.S. Cl. .................... 709/232; 709/202; 709/224; 709/233

(58) Field of Classification Search ................ 709/224, 709/223, 218, 219, 202, 233, 232; 714/26
See application file for complete search history.

(56) References Cited

U.S. PATENT DOCUMENTS

| | | | |
|---|---|---|---|
| 5,483,658 A | 1/1996 | Grube et al. | |
| 5,764,912 A | 6/1998 | Rosborough | |
| 5,781,449 A | 7/1998 | Rosborough | |
| 5,802,302 A | 9/1998 | Waclawsky et al. | |
| 5,872,976 A | 2/1999 | Yee et al. | |
| 5,881,237 A | 3/1999 | Schwaller et al. | |
| 5,946,302 A | 8/1999 | Waclawsky et al. | |
| 6,108,700 A | 8/2000 | Maccabee et al. | |
| 6,144,961 A | 11/2000 | de la Salle | |

(Continued)

OTHER PUBLICATIONS

"Using the Ping Command", Mar. 10, 1997, 16 pgs.

(Continued)

*Primary Examiner*—Rupal Dharia
*Assistant Examiner*—Djenane Bayard
(74) *Attorney, Agent, or Firm*—Gates & Cooper LLP

(57) ABSTRACT

A method for measuring a network connection's response time, of a given connection, and methods for adapting the delivery of information, based on that measurement, are provided for the purpose of delivering that information faster and more efficiently over the network. The speed of a network connection is determined. Thereafter, information is obtained across the network connection based on the speed of the network connection. The size of the information to be obtained decreases as the speed of the network connection decreases.

30 Claims, 2 Drawing Sheets

U.S. PATENT DOCUMENTS

| | | |
|---|---|---|
| 6,182,125 B1 * | 1/2001 | Borella et al. ............... 709/224 |
| 6,212,564 B1 * | 4/2001 | Harter et al. ............... 709/228 |
| 6,256,669 B1 | 7/2001 | Hurwitz |
| 6,272,539 B1 * | 8/2001 | Cuomo et al. ............... 709/223 |
| 6,308,211 B1 | 10/2001 | Rosborough et al. |
| 6,598,180 B1 * | 7/2003 | Dryfoos et al. ............... 714/38 |
| 6,601,098 B1 * | 7/2003 | Case et al. ................... 709/224 |
| 2001/0010059 A1 * | 7/2001 | Burman et al. ............... 709/224 |
| 2002/0099818 A1 * | 7/2002 | Russell et al. ............... 709/224 |
| 2004/0153792 A1 * | 8/2004 | Merriam ....................... 714/26 |

OTHER PUBLICATIONS

Lycos Network Site, Webmonkey, "Examine Your Network with Ping and Traceroute", 2001, 6 pgs.

Techencyclopedia, "Ping", 2001, 1 pg.

* cited by examiner

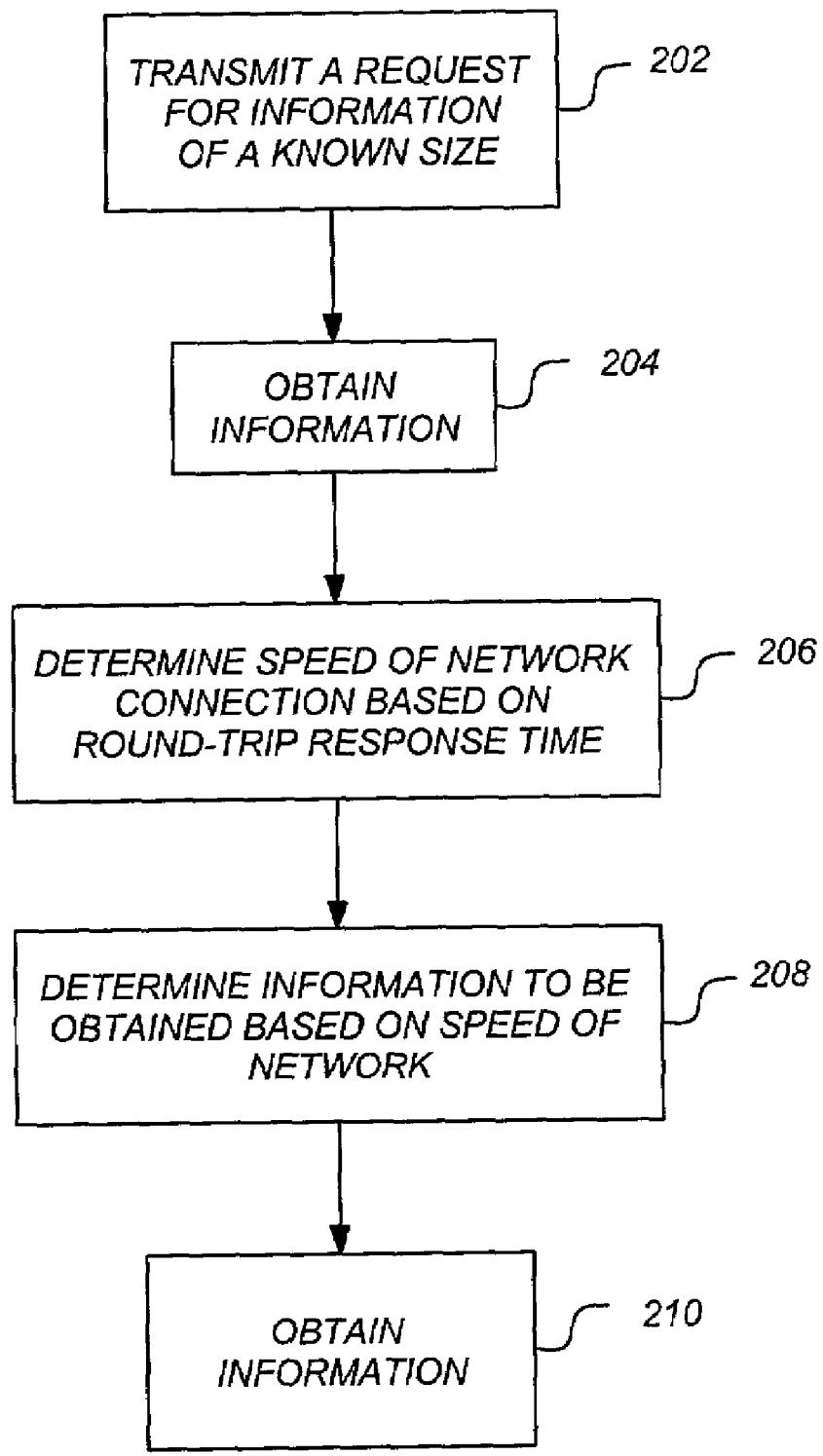

REDUCING INFORMATION TRANSMISSION TIME BY ADAPTING INFORMATION DELIVERY TO THE SPEED OF A GIVEN NETWORK CONNECTION

CROSS-REFERENCE TO RELATED APPLICATIONS

This application claims the benefit under 35 U.S.C. Section 119(e) of the following now abandoned U.S. provisional patent application, which is incorporated by reference herein:

Provisional Application Ser. No. 60/214,281, filed Jun. 22, 2000, by Paul F. Klein, entitled "REDUCING INTERNET OBJECT TRANSMISSION TIME BY ADAPTING INTERNET OBJECT DELIVERY TO THE SPEED OF A GIVEN INTERNET CONNECTION".

This application is a continuation-in-part of the following co-pending and commonly assigned patent applications, which applications are incorporated by reference herein:
U.S. patent application Ser. No 09/711,660, filed Nov. 13, 2000 entitled "METHOD AND APPARATUS FOR DETERMINING A RESPONSE TIME FOR A SEGMENT IN A CLIENT/SERVER COMPUTING ENVIRONMENT", by Paul F. Klein et al., which application claims the benefit of Provisional Application Ser. No. 60/172,026, filed Dec. 23, 1999, by Paul F. Klein, entitled "MEASURING RESPONSE TIME FOR VARIOUS SEGMENTS OF A STANDARD CLIENT/SERVER COMPUTING ENVIRONMENT BY DIRECTLY MEASURING ONE SEGMENT AND STATISTICALLY DERIVING RESPONSE TIME FOR THE REST";

U.S. patent application Ser. No. 09/761,904, filed Jan. 17, 2001 now U.S. Pat. No. 6,341,260 entitled "END-TO-END RESPONSE TIME MEASUREMENT FOR COMPUTER PROGRAMS USING STARTING AND ENDING QUEUES", by Paul F. Klein et al., which application is a continuation of U.S. Pat. No. 6,202,036, issued on Mar. 13, 2001, application Ser. No. 09/428,271, filed Oct. 27, 1999 entitled "END-TO-END RESPONSE TIME MEASUREMENT FOR COMPUTER PROGRAMS USING STARTING AND ENDING QUEUES", by Paul F. Klein et al., which application is a continuation of U.S. Pat. No. 5,991,705, issued on Nov. 23, 1999, application Ser. No. 08/899,195, filed Jul. 23, 1997, entitled "END-TO-END RESPONSE TIME MEASUREMENT FOR COMPUTER PROGRAMS USING STARTING AND ENDING QUEUES," by Paul F. Klein et al., and U.S. patent application Ser. No. 09/428,262, filed Oct. 27, 1999 now U.S. Pat. No. 6,526,371 entitled "ROUND TRIP RESPONSE TIME MEASUREMENT FOR COMPUTER PROGRAMS", by Paul F. Klein et al.,

BACKGROUND OF THE INVENTION

1. Field of the Invention

The present invention relates generally to obtaining information across a network, and more specifically to reducing the transmission time of such information by adapting the size of the information to the speed of a network connection.

2. Description of the Related Art

In today's electronic and Internet environment, the speed used while accessing and transmitting data over the Internet is a major success factor for an Internet company attempting to conduct income-generating commerce over the Internet. Specifically, with the popularity of the world wide web and the Internet, the real-time taken to access a web site and conduct commerce with that site must be within a reasonable time-frame (e.g., under 8 seconds per web page request). Additionally, a web site engaging in income-generating commerce over the Internet may lose customers if that web site's real-time access exceeds the reasonable time-frame. Such an income loss may occur due to the fact that the customer, engaging in commerce with that web site, will become impatient with the slow access, cancel the transaction and select another competitive web site that offers the same type of commerce at a faster speed.

Most web sites supplying electronic commerce that achieve less than a reasonable time-frame for a web transaction find it difficult to achieve a reasonable time-frame. When the need for obtaining a reasonable time-frame is added to the complexity of varying Internet and network speeds feeding to a web site, produced by various numbers of Internet Service Providers (ISP's), it is almost impossible to create an electronic commerce web site with just the right amount of information that will guarantee everyone a reasonable timeframe for real-time access.

BRIEF DESCRIPTION OF THE DRAWINGS

Referring now to the drawings in which like reference numbers represent corresponding parts throughout:

FIG. 2 is a flow chart illustrating the measuring of a speed of a network connection and adapting the retrieval of information based on the network connection speed in accordance with one or more embodiments of the invention.

SUMMARY OF THE INVENTION

Figure 1:
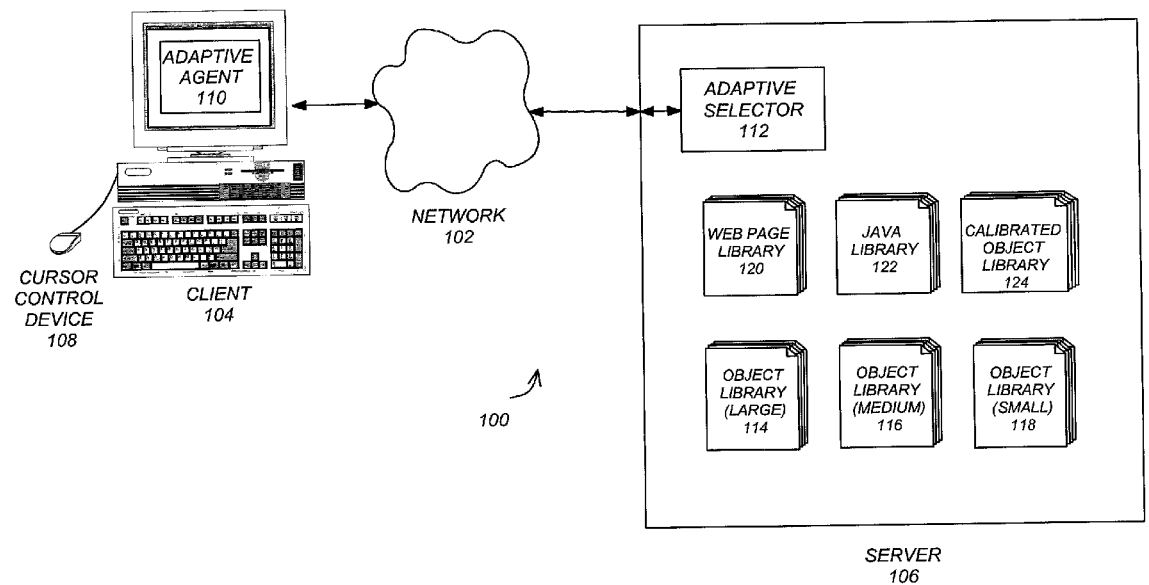
FIG. 1 schematically illustrates a hardware and software environment in accordance with one or more embodiments of the invention.

Making the transmission of information faster between a client and server is very desirable for the successful implementation of electronic commerce over a network such as the Internet. One method of accelerating the information/data transmission is to reduce the amount of data being requested thus transmitted, over a network connection. The technique used for dynamically making this happen, during the course of a network connection's life, is called adaptive response time.

Adaptive techniques revolve around measuring a response time between a client and server and using the results of the measurement to determine how much information (or how large an object) can be transmitted in a reasonable amount of time. When it is determined that requested information will take too long to transmit, the client or server adapts the request for reduced information (i.e., less information or an object of lesser size) that will take less time to transmit. Additionally, if it is determined that requested information will be transmitted very quickly across a high bandwidth network connection, the client or server may adapt the request for enhanced information (i.e., more information or an object of greater size) to provide the client with enhanced/additional capabilities/information.

DETAILED DESCRIPTION OF THE PREFERRED EMBODIMENTS

In the following description, reference is made to the accompanying drawings, which form a part hereof, and in which is shown, by way of illustration, one or more embodiments of the invention. It is understood that other embodiments may be utilized and structural and functional changes may be made without departing from the scope of the present invention.

Overview

Embodiments of the invention increase the speed with which a client retrieves information and content from a server and displays such information. The speed of a network connection (i.e., the Internet connection) is measured. Thereafter, the size of the information to be retrieved across the network connection is adjusted based on the speed of the network.

Hardware Environment and Software Embodiments

FIG. 1 schematically illustrates a hardware and software environment in accordance with one or more embodiments of the invention, and more particularly, illustrates a typical distributed computer system 100 using a network/network connection 102 to connect client computers 104 to server computers 106. A typical combination of resources may include a network 102 comprising the Internet, LANs (local area networks), WANs (wide area networks), SNA (systems network architecture) networks, or the like, clients 104 that are personal computers workstations, minicomputers, etc., and servers 106 that are personal computers, workstations, minicomputers, mainframes, etc. Additionally, both client 104 and server 106 may receive input (e.g., cursor location input) and display a cursor in response to an input device such as cursor control device 108.

In accordance with one or more embodiments of the invention, network 102 (such as the Internet) connects client computers 104 executing applications such as adaptive agent 110 to server computers 106 executing applications such as adaptive selector 112. Applications such as adaptive agent 110 and adaptive selector agent 112 may be written in a suitable programming language that is applicable to the computer hardware and software environment they need to execute on. For example, such applications 110 and 112 may be written in a portable language such as Java that is conducive to components that make up an industry standard Internet environment.

In one or mote embodiments of the invention, client 104, server 106, and network 102 comprise elements in the Internet environment. In such embodiments, client 104 may comprise or be equivalent to an Internet web browser such as NETSCAPE NAVIGATOR or MICROSOFT INTERNET EXPLORER, and adaptive agent 110 is equivalent to an applet (e.g., a Java applet) obtained from server 106. An applet is a program (usually small in size) that is downloaded from the server 106 and run from the browser on client 104. If the applet is written in the Java programming language, a Java virtual machine may be built into the browser and interprets the instructions.

In the Internet environment, server 106 may be a web server 106 currently available in the market such as the Web Server available from Netscape, the Internet Information Server (IIS) available from Microsoft, or the Web Server available from Apache. In addition, adaptive selector 112 is equivalent to a web server filter (e.g., the web server filter found in Microsoft's IIS Web Server). The use of the invention on the Internet and the use of the remaining components 114–120 are described in detail below.

Generally, components 110–124 all comprise logic and/or data embodied in or retrievable from a device, medium, signal, or carrier, e.g., a data storage device, a data communications device, a remote computer or device coupled to the computer across a network 102 or via another data communications device, etc. Moreover, this logic and/or data, when read, executed, and/or interpreted, results in the steps necessary to implement and/or use the present invention being performed.

Thus, embodiments of the invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass logic and/or data accessible from any computer-readable device, cartier, or media.

Those skilled in the art will recognize many modifications may be made to this exemplary environment without departing from the scope of the present invention. For example, those skilled in the art will recognize that any combination of the above components, or any number of different components, including different logic, data, different peripherals, different software, and different devices, may be used to implement the present invention, so long as functionality as described below are performed thereby.

In accordance with one or more embodiments of the invention, software applications executing in system 100 such as the adaptive agent 110 and adaptive selector 112 provide for adapting the transmission/retrieval of information across network 102 to the speed of network connection 102's speed. Adapting the retrieval of information to a network connection 102's speed is based on removing data from the information in such a way, as to keep the meaning of the information intact while decreasing that size of the information. The adapting process uses measurements taken of the network connection 102 speed and dynamically deduces what type of information alteration is to be used prior to sending the information over the network 102. One or more embodiments of the invention combine network connection 102 measurement and information adaptation.

Information transmitted across a network may be maintained in and referred to herein as an object (also referred to as an Internet object) in an object-oriented programming environment executing on client 104 or server 106. Alternatively, for purposes of this application, an object may refer generally to a unit of information that may be transmitted, used, retrieved, or otherwise accessed on or across a network 102. Information/objects that can be defined in various sizes without losing their meaning are called adaptable information/objects. An example of adaptable information is a web graphic. A web graphic is a picture defined as data, flowing over any given network 102 connection that contains a commercially digital encoding of a viewable art-form in one of the industry standard formats (e.g., JPEG [joint photographics expert group] or GIF [graphics interchange format]). Each graphic, as digitally encoded, may typically contain a stream of data bytes, large in size compared to plain text, which consume lots of real-time to transmit across a network 102 connection.

Varying sizes of an adaptable object may be utilized depending on the particular object in question. With a graphic object, the commercially available digital encoding (JPEG or GIF) may already provide a certain amount of data reduction from the art-forms original form. However, to reduce the size of the graphic even further and still maintain its visual meaning, the graphic can be made physically smaller visually, can have its color diminished or completely removed, or can have its color removed with reduced shades of gray. Any one of these acts substantially reduces the stream of data bytes required to transmit that graphic over the network 102 and thus reduces the amount of real-time that the transmission of the graphic will take.

Depending on the object and information being utilized and transmitted, adaptation may not be possible or useful for all objects transmitted across or utilized on a network 102, client 104, or server 106. For example, some objects must be transmitted in their entirety without change. However, most of the more utilized objects are likely adaptable.

The adaptation and transmission of an object across network 102 may be automatic, being called upon at the moment that an object is ready for transmission. Once data is removed from the object, its size is reduced and the goal of faster and more efficient network 102 transmission can be achieved.

Embodiment Details

Referring to FIG. 1, the components of system 100 provide the ability to measure the speed of a network connection 102 and adapt the size of an object based on the measurement. In one or more embodiments of the invention, client 104 issues object requests to server 106 through adaptive agent 110 and adaptive selector 112, allowing adaptive selector 112 the ability to make adaptive decisions on which object library (116, 118, or 120) the request is to be obtained from.

When client 104 makes a request of server 106 through adaptive agent 110, adaptive agent 110 may delay the request first, then issue its own network 102 request over network 102 to adaptive selector 112. Adaptive agent 110 issues a request to the calibrated object library 124 for an object/information with pre-known size and properties. Adaptive agent 110 measures the time it takes to retrieve this calibrated object by setting a software stopwatch prior to and just after the calibrated object is returned. This round-trip response time of the calibrated object, from the calibrated object library 124 is used to compute the current speed of the network connection 102 between client 104 and server 106. Alternatively, adaptive agent 110 may send a nominal request to adaptive selector 112 and measure its round trip response time similar to that described above. A nominal request is known in the computer industry as a ping.

Using the known size of the calibrated object (or based on the ping results), a bytes-per-second metric can be computed and this metric is sent from adaptive agent 110 to adaptive selector 112 across network 102. Adaptive selector 112 can utilize this value later when the adaptation processes takes place, but not now just saves it away. Adaptive agent 110 may send a new computation of bytes-per-second at any time to adaptive selector 112, and in doing so, replaces the previous computation saved away at adaptive selector 112.

Once adaptive selector 112 receives network 102 connection speed information from adaptive agent 110, adaptive agent 110 takes the original request out of delay and processes it as a standard request from client 104 and sends the request to adaptive selector 112 over network 102. Based on the current network connection 102 speed previously calculated, adaptive selector 112 adapts client 104's request, if it is an adaptable object, by selecting a replacement object (e.g., one of the three possible object library 114–118 replacements).

Objects in object library 114–118 are conceptually duplicate except that they contain less data while conveying equivalent meanings. As described above, an example of this kind of adaptable object is a graphic that can be made smaller or larger, but still retain its visual meaning. If the network connection 102 speed between client 104 and server 106 proves to be measured as very slow, below a threshold acceptable to client 104 and server 106, a smaller object may be chosen from the object library (small) 118. If the network connection 102 speed is measured to be very fast, a larger object may be chosen from object library (large) 114. Thus, client 104's request has been adapted to fit the optimal performance of the current network connection 102.

Operation over the World Wide Web

A more specific implementation, one that solves an Internet electronic commerce issue, is in guaranteeing faster access to commercial Internet web sites. In this implementation, client 104 (or an application executing on client 104) is equivalent to a commercially available Internet browser, adaptive agent 110 is equivalent to a Java applet that is obtained from Java library 122 and server 106 is equivalent to a commercially available web server. In addition, adaptive selector 112 is equivalent to a standard web server filter such as that found in Microsoft's IIS Web Server.

In this operation, web browser 110 makes a request for a web page from web server 106. That web page is retrieved from web page library 120 and intercepted by web server filter 112 where an applet tag is dynamically inserted into the web page. This tag references an applet that resides in Java library 122. The resulting web page is then sent to the web browser 104 over Internet network 102. Applet 110 executes in the web browser 104 and behaves just like an adaptive agent 110. Applet 110 makes a request to web server filter 112 for a calibrated object from the calibrated object library 124. The object is returned to web browser 104 via Internet network connection 102. Web browser 104 then times the retrieval of the calibrated object and computes a bytes-per-second response time metric by taking the total number of bytes in the calibrated object and dividing it by the number of seconds that transpired to retrieve that object. The results of that calculation are sent to web server filter 112 via Internet network connection 102 and saved away for later use. Alternatively, as described above, web browser 104 may ping the web server 106 to determine the speed of the Internet network connection 102.

Web browser 104 then resolves the web page results (e.g., the HTML [hypertext markup language] or XML [extensible markup language] as part of normal web browser 104 function) and makes additional requests for web page objects defined by the web page HTML or XML text. Accordingly, web browser 104 makes additional requests, for these resolved objects, to/from web server 106. Each object requested may be intercepted by web server filter 112 where adaptation of the object takes place. The required speed of the requested object is calculated by comparing its size to that of the calibrated object that was previously obtained from calibrated object library 124. If the requested object is calculated to take a long time to retrieve, web server filter 112 adapts the request to an object of lesser size from object library (small) 118 and retrieves that object from the small library 118.

If the requested object is calculated to be quick in speed to retrieve/transmit (e.g., if the Internet connection 102 is a high bandwidth connection), a larger more complex object could be used instead from object library (large) 114. By selecting a large object, web server filter 112 may provide the web browser 104 (i.e., the requester) more information than a user/web browser 104 on a slower Internet connection 102. Thus, this method provides an optimal amount of information for the specific speed of a given Internet connection 102.

Variation to the Operation over the World Wide Web

One or more variations of the above-described world wide web embodiments may be implemented. In one or more variations, web browser 104 makes a request for a web page from web server 106. Instead of the web page, from web page library 120 containing the actual web object, the web page contains an applet definition in its place. As parameters to that applet, the names of the three possible adaptive objects may be provided. The web page is then served up to the web browser 104 over Internet connection 102 as normal. Web browser 104 resolves the web page, encounters the applet definitions, and then executes them as part of any commercial web browser 104 function.

Each applet 110 tests the Internet connection 102 response time between web browser 104 and web server 106 by pinging web server filter 112 and measuring its round trip response time similar to that described above. Based on the applet's 110 measurement of the current Internet connection 102 response time, the applet 110 may make a request for one of the three adaptive objects from one of the three object libraries 114–118 at web server 106. Applet 110 may (or may not) make this request directly, bypassing web server filter 112. Web server 106 passes back the specific object directly to the applet 110 that made the original request. The applet then renders the object at the web browser 104 in a standard way. In doing so, each applet 110 makes the decision to which sized object to retrieve from web server 106 that is optimal for it's current Internet connection 102. Alternatively, applet 110 may be used to determine the speed of the Internet connection 102 while the determination of the particular object to transmit remains with web server filter 112.

Program Flow

FIG. 2 is a flow chart illustrating the measuring of a speed of a network connection 102 and adapting the retrieval of information based on the network connection 102 speed in accordance with one or more embodiments of the invention. Steps 202–206 provide for the determination of a speed of a network connection 102. At step 202, a request for information of a known size is transmitted. The information of the known size is obtained at step 204 and the speed of the network 102 is determined at step 206 based on the roundtrip response time of the information. Such a determination may simply comprise a ping or may involve further details and object comparisons as described above. Further, as described above, one or more of steps 202–206 may be performed by client 104 (e.g., by an adaptive agent 110 such as a web browser or by an applet) or by a server 106 (e.g., by an adaptive selector 112 such as a web server filter).

Alternatively, the speed of the network connection 102 may be determined as described in one or more of the following co-pending and commonly assigned patent applications which applications are fully incorporated by reference herein:

U.S. patent application Ser. No. 09/711,660, filed Nov. 13, 2000 entitled "METHOD AND APPARATUS FOR DETERMINING A RESPONSE TIME FOR A SEGMENT IN A CLIENT/SERVER COMPUTING ENVIRONMENT", by Paul F. Klein et al., which application claims the benefit of Provisional Application Ser. No. 60/172,026, filed Dec. 23, 1999, by Paul F. Klein, entitled "MEASURING RESPONSE TIME FOR VARIOUS SEGMENTS OF A STANDARD CLIENT/SERVER COMPUTING ENVIRONMENT BY DIRECTLY MEASURING ONE SEGMENT AND STATISTICALLY DERIVING RESPONSE TIME FOR THE REST,";

U.S. patent application Ser. No. 09/761,904, filed Jan. 17, 2001 entitled "END-TO-END RESPONSE TIME MEASUREMENT FOR COMPUTER PROGRAMS USING STARTING AND ENDING QUEUES", by Paul F. Klein et al., which application is a continuation of U.S. Pat. No. 6,202,036, issued on Mar. 13, 2001, application Ser. No. 09/428,271, filed Oct. 27,1999 entitled "END-TO-END RESPONSE TIME MEASUREMENT FOR COMPUTER PROGRAMS USING STARTING AND ENDING QUEUES", by Paul F. Klein et al., which application is a continuation of U.S. Pat. No. 5,991,705, issued on Nov. 23, 1999, application Ser. No. 08/899,195, filed Jul. 23, 1997, entitled "END-TO-END RESPONSE TIME MEASUREMENT FOR COMPUTER PROGRAMS USING STARTING AND ENDING QUEUES," by Paul F. Klein et al., and U.S. patent application Ser. No. 09/428,262, filed Oct. 27, 1999 entitled "ROUND TRIP RESPONSE TIME MEASUREMENT FOR COMPUTER PROGRAMS", by Paul F. Klein et al.

At step 208, a determination is made regarding the information to be obtained across network connection 102 based on the speed of the network. This determination may be made by the client 104 (e.g., by adaptive agent 110) or by the server 106 (e.g., by adaptive selector 112 or another application executing on server 106). The determination comprises evaluating the speed of the network connection 102 and electing to obtain information of a reduced size as the speed of the network connection 102 decreases. Thus, information may be stored in various sizes in libraries 114–118 and is obtained by client 104 depending on the speed of the network connection 102. For example, as described above, graphic information may be stored in various sizes varying from being physically smaller visually, to having diminished color, to having color removed and reduced shades of gray. At step 210, the information is obtained/retrieved across network connection 102 from server 106 to client 104.

CONCLUSION

This concludes the description of one or more embodiments of the invention. In summary, adaptive technology allows a server to adapt the delivery of information to optimize a specific network connection, allowing faster and more efficient transfer of those objects. By using technology that measures the network speed to a given server, a client can pre-determine the amount of real-time required to transfer information. If this real-time is unacceptable (e.g., for successful Internet commerce), the size of the information to be obtained is adaptively reduced until the real-time requirements meets or exceeds the client's desires (e.g., until it complies with successful Internet commerce standards). By pre-measuring a network connection's speed, information being transmitted can be adapted in some fashion, to the connection speed, before being sent. Accordingly, the information's transmission time is optimized.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. A computer-inplarnented method for obtaining information across a network comprising:

(a) an adaptive agent determining a speed of a network connection to which a computer is attached by:

(i) a client making a request for a unit object;

(ii) the adaptive agent on the client intercepting and delaying said request for said first object;

(iii) the adaptive agent issing its own network request, across the network connection, to a calibrated object library on a server, for a second object of a pre-known size and properties;

(ii) the adaptive agent receiving the second object of the pre-known size and properties from the calibrated object library across the network connection; and (iii) the adaptive agent measuring a round-trip response time calculated from the transmitting of the request to completion of the obtaining of the second object from across the network connection; and (b) the adaptive agent taking said request for the first object out of delay and forwarding said request for the first object to a server across the network connection; and (c) the client receiving, in response to the request for the first object, information from across the network connection based on the speed of the network connection, wherein:

(i) a size of the information to be obtained decreases as the speed of the network connection decreases; and (ii) the information is obtained across the network connection from one or more object libraries that maintain the information in various sizes.

2. The method of claim 1 wherein the determining a speed of a network connection further comprises pinging a host where the information is stored from across the network connection.

3. The method of claim 1 wherein the information comprises graphics.

4. The method of claim 3 wherein the information to be obtained is reduced in size such that the graphic is physically smaller visually as the speed of the network connection decreases.

5. The method of claim 3 wherein the information to be obtained is reduced in size such that color is diminished from the graphic as the speed of the network connection decreases.

6. The method of claim 3 wherein the information to be obtained is reduced in size such that color is removed and shades of gray are reduced from the graphic as the speed of the network connection decreases.

7. The method of claim 1 wherein the determining a speed is performed by an appler obtained by the client.

8. The method of claim 7 wherein an applet tag corresponding to the obtained applet is present in a web page obtained by the client, wherein the applet tag is dynamically inserted into the web page by the server.

9. The method of claim 1 further comprising the client: determining particular information to obtain based on the speed of the network connection; and
obtaining die particular information from the server.

10. The method of claim 1 further comprising the client issuing a request for information;
transmitting the speed of the network connection to the server; and
obtaining particular information from the server, wherein the sewer determines the particular information based on the speed of the network connection.

11. A computer-implemented system for obtaining information across a computer network comprising:

(a) a client;

(b) an adaptive agent executing on the client, wherein the adaptive agent is configured to:

(i) determine a speed of a network connection to which a computer is attached by:

(1) intercepting and delaying a request from said client for a first object;

(2) transmitting its own network request, across the network connection, to a calibrated object library on a server, for a second object of a pre-known size and properties;

(2) receiving the second object of the pre-known size and properties from across the network connection;

(3) measuring a round-trip response time calculated from the transmitting of the request to a completion of the obtaining of the second object from across the network connection; and (ii) take said request for the first object out of delay and forwarding said request for the first object to a server across the network connection; and (iii) obtain information from across the network connection based on the speed of the network connection, wherein:

(1) a size of the information to be obtained decreases as the speed of the network connection decreases; and (2) the information is obtained across the network connection from one or more object libraries that maintain the information in various sizes.

12. The system of claim 11 wherein the adaptive agent further determines a speed of a network connection by pinging a host where the information is stored from across the network connection.

13. The system of claim 11 wherein the information comprises graphics.

14. The system of claim 13 wherein the information to be obtained is reduced in size such that the graphic is physically smaller visually as the speed of the network connection decreases.

15. The system of claim 13 wherein the information to be obtained is reduced in size such that color is diminished from the graphic as the speed of the network connection decreases.

16. The system of claim 13 wherein the information to be obtained is reduced in size such that color is removed and shades of gray are reduced from the graphic as the speed of the network connection decreases.

17. The system of claim 11 wherein the adaptive agent is an applet.

18. The system of claim 17 wherein an applet tag corresponding to the obtained applet is present in a web page obtained by the client, wherein the applet tag is dynamically inserted into the web page by the saver.

19. The system of claim 11 wherein the client is further configured to:
determine particular information to obtain based on the speed of the network connection; and
obtain the particular information from the server.

20. The system of claim 11 wherein the client is further configured to:
issue a request for information;
transmit the speed of the network connection to the server; and
obtain particular information from the server, wherein the server determines the particular information based on the speed of the network connection.

21. An article of manufacture embodying logic for performing a method of obtaining information across a network, the method comprising:
(a) determining a speed of a network connection to which a computer is attached by:
(i) a client making a request for a first object;
an adaptive agent, on the client, intercepting and delaying said request for said first object;
(iii) the adaptive agent issuing its own network request, across the network connection, to a calibrated object library on a server, for second object of a pre-known size and properties;
(ii) the adaptive agent obtaining the second object of the pre-known size and properties from across the network connection;
(iii) the adaptive agent measuring a round-trip response time calculated from the transmitting of the request to completion of the obtaining of the second object from across the network connection; and
(b) the adaptive agent taking said request for the first object out of delay and forwarding said request for the first object to a server across the network connection; and
(c) the client receiving in response to the request for the first object, information from across the network connection based on the speed of the network connection, wherein:
(i) a size of the information to be obtained decreases as the speed of the network connection decreases; and
(ii) the information is obtained across the network connection from one or mote object libraries that maintain the information in various sizes.

22. The article of manufacture of claim 21 wherein the method for determining a speed of a network connection further comprises pinging a host where the information is stored from across the network connection.

23. The article of manufacture of claim 21 wherein the information comprises graphics.

24. The article of manufacture of claim 23 wherein the information to be obtained is reduced in size such that the graphic is physically smaller visually as the speed of the network connection decreases.

25. The article of manufacture of claim 23 wherein the information to be obtained is reduced in size such that color is diminished from the graphic as the speed of the network connection decreases.

26. The article of manufacture of claim 23 wherein the information to be obtained is reduced in size such that color is removed and shades of gray are reduced from the graphic as the speed of the network connection decreases.

27. The article of manufacture of claim 21 wherein the method for determining a speed is performed by an applet obtained by the client.

28. The article of manufacture of claim 27 wherein an applet tag corresponding to the obtained applet is present in a web page obtained by the client, wherein the applet tag is dynamically inserted into the web page by the server.

29. The article of manufacture of claim 21, the method further comprising:
the client determining particular information to obtain based on the speed of the network connection; and
the client obtaining the particular information from the server.

30. The article of manufacture of claim 21, the method further comprising:
the client issuing a request for information;
the client transmitting the speed of the network connection to the server; and
the client obtaining particular information from the server, wherein the server determines the particular information based on the speed of the network connection.

* * * * *